United States Patent
Tarsky et al.

[11] Patent Number: 6,061,784
[45] Date of Patent: *May 9, 2000

[54] METHOD AND DEVICE FOR TRANSFERRING DATA FRAMES WITHIN A SERIAL STREAM

[75] Inventors: Anatoly Tarsky; Harold J. Snow, both of Nepean, Canada

[73] Assignee: Nortel Networks Corporation, Montreal, Canada

[*] Notice: This patent is subject to a terminal disclaimer.

[21] Appl. No.: 09/195,245

[22] Filed: Nov. 18, 1998

Related U.S. Application Data

[63] Continuation of application No. 08/773,956, Dec. 26, 1996, Pat. No. 5,842,007.

[51] Int. Cl.[7] ................ H04J 3/02; H04J 3/06; H04J 3/16
[52] U.S. Cl. ............ 712/225; 712/220; 709/231; 709/233; 709/236; 709/248
[58] Field of Search .................... 709/231, 233, 709/236, 248; 712/220, 225

[56] References Cited

U.S. PATENT DOCUMENTS

| | | | |
|---|---|---|---|
| 4,893,306 | 1/1990 | Chao et al. | 370/539 |
| 4,964,141 | 10/1990 | Matsushima et al. | 375/354 |
| 5,210,750 | 5/1993 | Nassehi et al. | 370/440 |
| 5,351,239 | 9/1994 | Black et al. | 370/476 |
| 5,528,579 | 6/1996 | Wadman et al. | 370/472 |
| 5,544,324 | 8/1996 | Edem et al. | 395/200.61 |
| 5,623,557 | 4/1997 | Shimoyoshi et al. | 382/246 |
| 5,673,265 | 9/1997 | Gupta et al. | 370/432 |
| 5,842,007 | 11/1998 | Tarsky | 712/220 |

FOREIGN PATENT DOCUMENTS

| | | | |
|---|---|---|---|
| 0 214 352 | 3/1987 | European Pat. Off. | H04L 11/20 |
| 0 222 544 | 5/1987 | European Pat. Off. | H04J 3/04 |
| 0 397 139 | 11/1990 | European Pat. Off. | H04J 3/16 |
| WO 86/06231 | 10/1986 | WIPO | H04J 3/16 |

OTHER PUBLICATIONS

Douskalis W.: "A Number Theoretic Approach to Time Division Multiplexing" IEEE Transactions on Communications, vol. 38, No. 9, Sep./1990.

*Primary Examiner*—Zarni Maung
*Assistant Examiner*—Bharat Barot

[57] ABSTRACT

A method of transferring payload, control and messaging data in a communications system, in a serial data stream at a pre-set bit rate per second is disclosed. The method comprises, transferring a chosen integer number of frames of serial data per second. Each frame a number of timeslots of data. Each timeslot comprises a predetermined number of first bits comprising payload related data or messaging bits and a calculated number of second bits comprising control bits. The calculated number is calculated so that the sum of the predetermined number and the calculated number multiplied by the number of timeslots and the chosen integer number equals the number of bits transferred in one second at the pre-set bit rate. Preferably, bits from the second bits at fixed intervals within the serial data stream comprise a out-of-band communications channel with the stream. Preferably, the pre-set bit rate is synchronized to the clock of a host communications system. A communications system employing the method is further disclosed.

26 Claims, 6 Drawing Sheets

FIG. 5

| 11 | 10 | 9 | 8 | 7 | 6 | 5 | 4 | 3 | 2 | 1 | 0 | | |
|---|---|---|---|---|---|---|---|---|---|---|---|---|---|
| SPOILER | O.O.B. CHANNELS | D7 | D6 | D5 | D4 | D3 | D2 | D1 | D0 | UBIT | PAR | | |
| | RM→CEM / CEM→RM | DATA | | | | | | | | | | | |
| 1 | 1 1 | 1 | 1 | 1 | 1 | 1 | 1 | 1 | 1 | 1 | 1 | TS0 (FRAMING) | |
| 0 | I0 EnP0 | | | | | | | | | | | TS1 | |
| 0 | 0 | | | | | | | | | | | TS2 | |
| 0 | I1 EnP1 | | | | | | | | | | | TS3 | |
| 0 | 0 | | | | | | | | | | | TS4 | |
| 0 | I2 EnP2 | | | | | | | | | | | TS5 | |
| 0 | 0 | | | | | | | | | | | TS6 | |
| 0 | o0 | | | | | | | | | | | TS7 | |
| 0 | 0 | | | | | | | | | | | TS8 (MESSAGING) | |
| 0 | I0 0 | | | | | | | | | | | TS9 | |
| 0 | 0 | | | | | | | | | | | TS10 | |
| 0 | I1 0 | | | | | | | | | | | TS11 | |
| 0 | 0 | | | | | | | | | | | TS12 | |
| 0 | I2 0 | | | | | | | | | | | TS13 | |
| 0 | 0 | | | | | | | | | | | TS14 | |
| 0 | o1 | | | | | | | | | | | TS15 | |
| 0 | RA0 | | | | | | | | | | | TS16 (MESSAGING) | |
| 0 | I0 0 | | | | | | | | | | | TS17 | |
| 0 | RA1 | | | | | | | | | | | TS18 | |
| 0 | I1 0 | | | | | | | | | | | TS19 | |
| 0 | RA2 | | | | | | | | | | | TS20 | |
| 0 | I2 0 | | | | | | | | | | | TS21 | |
| 0 | RA3 | | | | | | | | | | | TS22 | |
| 0 | o2 | | | | | | | | | | | TS23 | |
| 0 | RA4 | | | | | | | | | | | TS24 (MESSAGING) | |
| 0 | I0 0 | | | | | | | | | | | TS25 | |
| 0 | RA5 | | | | | | | | | | | TS26 | |
| 0 | I1 0 | | | | | | | | | | | TS27 | |
| 0 | RA6 | | | | | | | | | | | TS28 | |
| 0 | I2 0 | | | | | | | | | | | TS29 | |
| 0 | RA7 | | | | | | | | | | | TS30 | |
| 0 | o3 | | | | | | | | | | | TS31 | |
| ... | | | | | | | | | | | | | |
| 0 | o7 | | | | | | | | | | | TS63 | |
| ... | | | | | | | | | | | | | |
| 0 | RA4 | S1 | S0 | F5 | F4 | F3 | F2 | F1 | F0 | | | TS248 (OPERATIONS) | |
| 0 | I0 ACT4 | | | | | | | | | | | TS249 | |
| 0 | RA5 | | | | | | | | | | | TS250 | |
| 0 | I1 ACT5 | | | | | | | | | | | TS251 | |
| 0 | RA6 | | | | | | | | | | | TS252 | |
| 0 | I2 ACT6 | | | | | | | | | | | TS253 | |
| 0 | RA7 | | | | | | | | | | | TS254 | |
| 0 | PE/LE ACT7 | | | | | | | | | | | TS255 | |

Bit Sequence (lsb→msb):

Start Flag (8bits): RA0, RA1, ..., RA7
Size (8bits): RA0, RA1, ..., RA7
Address (16bits): An(0:15)=(RA0, RA1, ..., RA7), (RA0, RA1, ..., RA7)
Data (8bits x n bytes): (RA0, RA1, ..., RA7)An, (RA0, RA1, ..., RA7)An+1, ...,
BIP (8bits): RA0, RA1, ..., RA7
ACK (8bits): RA0, RA1, ..., RA7

| CEM | RM |
|---|---|
| IDLE | IDLE |
| START | IDLE |
| SIZE | IDLE |
| ADDRESS | IDLE |
| DATA | IDLE |
| BIP → | IDLE |
| IDLE | IDLE |
| ... | ... |
| IDLE | ← PACK / NACK |

RA STATE SEQUENCES DURING WRITE CYCLE

| NO ERRORS | | ERRORS | |
|---|---|---|---|
| CEM | RM | CEM | RM |
| IDLE | IDLE | IDLE | IDLE |
| START | IDLE | START | IDLE |
| SIZE | IDLE | SIZE | IDLE |
| ADDRESS | IDLE | ADDRESS | IDLE |
| BIP→ | IDLE | BIP→ | IDLE |
| IDLE | IDLE | IDLE | IDLE |
| ... | ... | ... | ... |
| IDLE | ← PACK | IDLE | ← NACK |
| IDLE | DATA | IDLE | IDLE |
| IDLE | BIP | IDLE | IDLE |
| IDLE | IDLE | IDLE | IDLE |

RA STATE SEQUENCES DURING READ CYCLE

FIG. 8

METHOD AND DEVICE FOR TRANSFERRING DATA FRAMES WITHIN A SERIAL STREAM

CROSS-REFERENCE TO RELATED APPLICATIONS

This application is a continuation of application Ser. No. 08/773,956 filed Dec. 26, 1996, now U.S. Pat. No. 5,842,007.

FIELD OF THE INVENTION

This invention relates to a method for transferring serial data and a system incorporating the method. More specifically, the invention relates to a method of and system for transferring control, messaging, and payload data in a serial stream in a communications system.

BACKGROUND OF THE INVENTION

Communications systems, such as, for example, those used in telephony applications often require the transfer of control, messaging and payload data between components via a single serial link. A modular communications system which may utilize such a serial link is disclosed in co-pending U.S. patent application Ser. No. 08/721,095, still pending, the contents of which are incorporated by reference, herein.

If, as in the disclosed system, the payload data may further be transferred from and to a host systems, the serial link should accommodate the transfer of such data without manipulating the format of the payload data used by the host system. Moreover, the clock of the communications system and the serial link should be synchronized with the clock of the host system and the clock of the interface to the host system. Further, the bandwidth of the serial link should be sufficient to meet system requirements, but should also be flexible in order to support a plurality of applications. Finally, in addition to carrying payload data the link should carry low level control data between the components, and potentially high level control or messaging data and framing data.

The present invention seeks to meet some of the above requirements.

SUMMARY OF THE INVENTION

In accordance with an aspect of the present invention, a transmitter for connection to a communication network, includes a serial link interface, operable to transfer a first chosen integer number of frames per second at a pre-set bit rate from the transmitter. Each of these frames includes a chosen second integer number of groups of bits. Each group has an identical number of bits, and includes a predetermined number of first bits, and a calculated number of second bits. The first bits include payload related data in at least some of the groups. The second bits include a framing bit in each of the groups, and another bit carrying control information in at least some of the groups. The calculated number is calculated so that the sum of the predetermined number and the calculated number multiplied by the chosen first integer and the chosen second integer equals the number of bits transferred in one second at the pre-set bit rate.

In accordance with another aspect, the invention includes a method of transferring bits in frames within a serial stream. The method includes transferring a first chosen integer number of frames per second at a pre-set bit rate. Each of the frames includes a chosen second integer number of groups of bits. Each group of bits has an identical number of bits. Each group includes i) a predetermined number of first bits, the first bits with payload related data in at least some of the groups; and ii) a calculated number of second bits, including a framing bit in each of the groups, and another bit carrying control information in at least some of the groups. The calculated number is calculated so that the sum of the predetermined number and the calculated number multiplied by the chosen first integer and the chosen second integer equals the number of bits transferred in one second at the pre-set bit rare.

In accordance with yet another aspect, a data frame transmitted on a carrier medium, at a pre-set bit rate within a serial stream, wherein a first chosen integer number of data frames are transmitted per second, includes a chosen second integer number of groups of bits. Each group of bits has an identical number of bits. Each group includes i) predetermined number of first bits, including payload related data in at least some of the groups; ii) a calculated number of second bits, including a framing bit in each of the groups, and another bit carrying control information in at least some of the groups. The calculated number is calculated so that the sum of the predetermined number and the calculated number multiplied by the chosen first integer and the chosen second integer equals the number of bits transferred in one second at the pre-set bit rate.

In accordance with yet a further aspect of the invention, a transmitter for connection to a communications system, includes a serial link interface operable to transfer a first chosen integer number of frames of data, per second, at a pre-set bit rate from the transmitter. Each frame includes a chosen second integer number of time slots of data. Each time slot includes a predetermined number of consecutive first bits, the first bits comprising payload related data, framing or messaging bits; and a calculated number of consecutive second bits, the second bits comprising control or framing bits. The calculated number is calculated so that the sum of the predetermined number and the calculated number multiplied by the chosen first integer and the chosen second integer equals the number of bits transferred in one second at the pre-set bit rate.

BRIEF DESCRIPTION OF THE DRAWINGS

In the figures which illustrate, by way of example, embodiments of the present invention.

FIG. 5 is a further block diagram of data organization within a serial stream transferred in accordance with an aspect of this invention;

FIG. 8 is a further block diagram of a protocol used in and embodiment of the present invention.

DETAILED DESCRIPTION OF THE PREFERRED EMBODIMENTS

Figure 1:
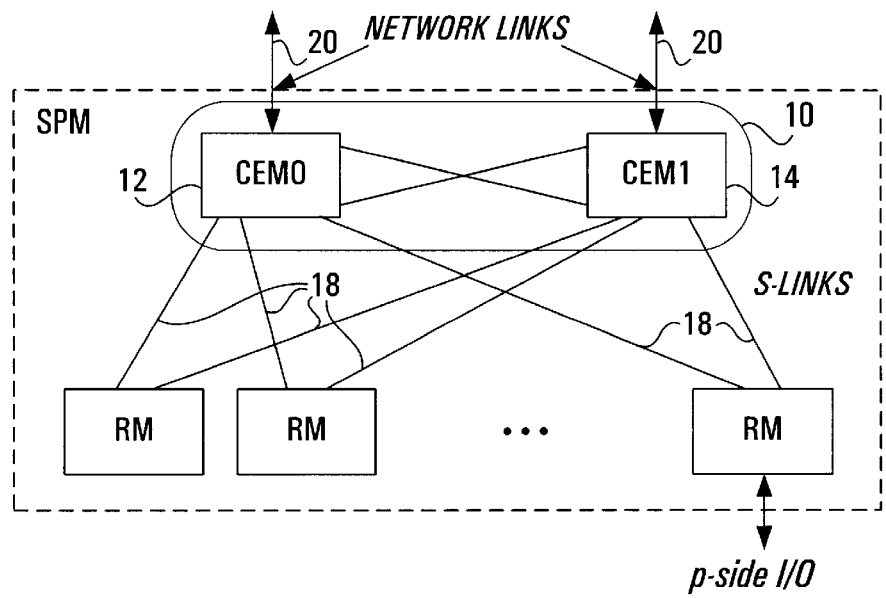
FIG. 1 is a block diagram of a communications system comprising a serial data link in accordance with an aspect of this invention.

FIG. 1 illustrates the architecture of a modular communications system, that may be used as a stand-alone telecommunications system or a peripheral subsystem for an existing telecommunications switching system. A common equipment module ("CEM") complex 10 comprises two CEMs 12, 14 (control modules). The two CEMs 12, 14 are interconnected to each other. Each CEM 12, 14 is connected to a plurality of resource modules 16 ("RMs") by way of resource module links 18. The resource module links 18 are also referred to as logical S-Links 18.

This modular design allows a communications system having specific functionalities to be assembled from a small set of generalized components (ie. RMs 16 and CEM 12,14). To provide sufficient and scalable control processing, distributed computing techniques are employed, with each RM 16 having its own processing capability and performing local low-level control functions under supervision of a central control component (ie. a CEM 12, 14). Thus, telecom functions are physically separated into control, interface, signalling and service modules. The alignment of the physical and logical partitioning allows the various functions to be efficiently mixed in different combinations with minimal new development. The architecture allows for efficient utilization of the switching function of CEMs 12,14 and RMs 16 by providing a means by which the amount of payload data exchanged with RMs 16 can be varied to match the requirements of a particular service circuit implementation.

Physically, each resource module link is electrically isolated from every other resource link, effecting point-to-point connectivity between RMs 16 and CEMs 12,14. This allows for the isolation and easy detection of module failures. The ambiguity in the location of a fault is limited to at most two modules and the link between them.

The two CEMs 12, 14 operate in redundancy. One CEM (12 or 14) is active, while the other remains inactive. Inactive CEM (14 or 12) is normally in standby mode ready to become active in the event of a failure on the presently active CEM (12 or 14). The exchange of activity is governed by software and hardware in each CEM 12, 14 and is termed a "SWACT" (SWitch of ACTivity).

Similarly, RMs 16 can be provisioned with various redundancy schemes, as required. One RM 16 may serve as a redundant RM 16 for one or more active RMs 16. In the event of a failure of an active RM payload data may be switched through a redundant RM 16. RM 16 sparing is controlled by the CEMs 12,14. The CEMs 12,14 incorporate circuitry to efficiently manage the transfer of payload data from a failed RM 16 to a spare.

Identical payload data is transferred from CEM 12,14 to working RMs 16 and redundant RMs 16 to keep the redundant RMs 16 ready to take the place of a working RM 16 in case of failure. For payload data transferred from the RMs 16 to the CEM complex 10, the payload data is selected from the working RM 16. Payload data from redundant RMs 16 is ignored.

Each RM 16 selects its payload timeslots from an active CEM 12 or 14. The selection is synchronized to frames within the stream to facilitate a smooth switch of activity.

CEMs 12, 14 may further be interconnected to higher nodes in a host communications system (as for example, DMS™ switch equipment—not shown) by way of host interface 20 for the exchange of data with the host system. This allows the communications system to function as a peripheral subsystem.

CEM complex 10 is the center for overall control and co-ordination of the communications system. Complex 10 co-ordinates the setup and takedown of connections between RMs 16 or between RMs 16 and host interface 20, in response to requests from a host communications system (not shown). Complex 10 further allocates and de-allocates system resources to calls and call events and coordinates resource module sparing operations and diagnostic operations.

RMs 16 supply payload processing capabilities to the communications system. The number and type of RMs 16 required is application and provisioning dependent. RMs 16 can be broadly categorized by the type of resource they supply:

- interface (e.g. OC-3 Carrier);
- pulse code modulation services (e.g. tone detection & generation, echo cancelling);
- messaging services (e.g. HDLC message format translation); or
- computing services.

Figure 2:
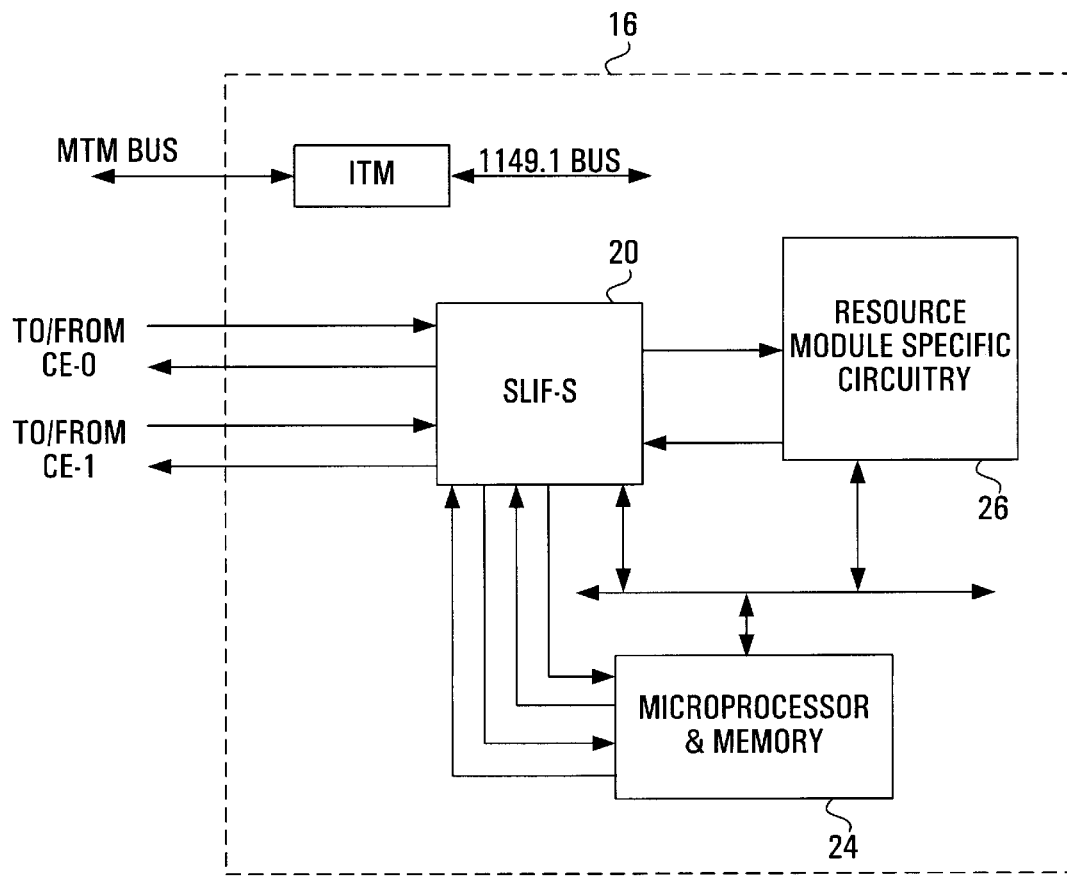
FIG. 2 is a block diagram of a component of the system of FIG. 1.

The architecture of a generic RM 16 is shown in FIG. 2. Each RM 16 comprises a Serial Link Interface Slave 20 ("SLIF-S") interconnected with a microprocessor and associated memory 24 and resource module specific circuitry 26 which varies depending on the nature and function of a particular, specific RM 16. The SLIF-S 20 is implemented using application specific integrated circuit ("ASIC"). Additionally, each RM 16 comprises an intelligent task master JTAG 1149.1 interface 28 allowing connection of an RM 16 to a test and maintenance bus (not shown).

Resource module links (or logical S-Links 18) connect the CEMs 12,14 to the RMs 16. These S-Links 18 are serial links that,

- transport payload data between the CEM complex 10 and the RMs 16;
- transport the system clock from the CEM complex 10 to RMs 16;
- transport the CEM activity state from the CEM complex 10 to RMs 16;
- transport low-level control (including RM 16 reset control) from the CEM complex 10 to the RMs 16, and low level status from the RMs 16 to the CEM complex 10;
- transport high level control and status between the CEM complex 10 and the RMs 16 (messaging);
- detect the presence or absence of an RM 16 by the CEM complex 10; and
- detect transport errors induced by electrical noise or other mechanisms.

All RMs 16 share a common interface definition (S-Link) to the CEMs 12, 14. The maximum available payload bandwidth to an RM 16 can be increased by replicating the S-Link 18 interface as required, by utilizing primary and secondary S-Links between an RM 16 and the CEM 12,14. This enhances provisioning flexibility by limiting the number of distinct physical RM interface slot types.

Within the CEMs 12,14 S-Links 18 are connected to the RMs 16 by a set of six S-Link Interface Master (SLIF-M) devices (not shown). The SLIF-M devices function as an input/output point for transferring payload and control data between the CEM complex 10 and RMs 16. The SLIF-M device is interconnected to a bandwidth allocator selector a bandwidth allocator distributor (not shown) within CEM 12, 14.

Each RM 16 is connected to two logical S-Links 18, one connecting it to each CEM 12, 14 within the CEM complex 10 (FIG. 1). Each of these two logical S-Links 18 can be activated depending on sparing architecture for a particular RM 16. Each of the logical S-Links 18 may contain several physical S-Links, one primary link and additional secondary links.

A primary link is used to carry a framing channel; an operations channel; an out of band communications channel; an internal messaging channel; and payload channels. Secondary links generally only carry a subset of the channels carried by the primary links namely, payload channels; and an out of band communications channel.

Figure 3:
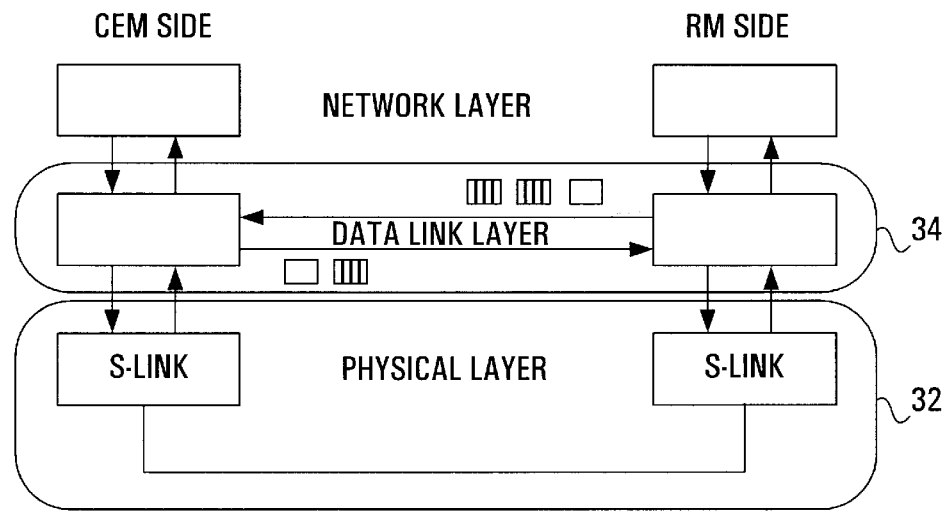
FIG. 3 is a block diagram of interface layers used in a serial link in accordance with an aspect of this invention.

Logically, the protocol used by the serial S-Link 18 interface is layered as shown in FIG. 3. Physical layer 32 is analogous to layer 1, the physical layer, of the ISO Opens System Interconnection Reference Model (the "OSI Reference Model"). The physical layer 32 comprises at least four signals (not shown); two permitting serial communication from RM 16 to CEM 12 or 14; and two enabling serial communication from CEM 12 or 14 to RM 16. This permits full-duplex communication between RMs 16 and CEMs 12,14. One of each of the two signals comprises a transmit and receive clock, while the other of the two signals comprises a single wire serial connection between RM 16 and CEM 12,14. In the event that primary and secondary (physical) S-Links are used to connect an RM 16 to the CEM 12,14 only a single set of clock signals are required.

The clock allows for synchronous data transfer via the serial communication signals. The clock of the active CEM 12 or 14 is transferred to the individual RMs 16 by means of this clock signal, and the RM 16 clocks can be, and are, synchronized with the clock of the active CEM 12 or 14. Further, this clock can be, and where applicable is, synchronized to the clock of a host communications system (not shown).

RMs 16 with on-board microprocessors 24 communicate with the processors (not shown) of CEM 12,14 via a messaging protocol. Data link layer 34 is analogous to layer 2, the data link layer, of the OSI Reference Model. The data link layer 34 of the S-Link 18 protocol allows transporting of high level messaging information in the S-Link 18 frames across the physical links. The data link layer 34 ensures reliability of the physical link, and provides the means to activate, maintain and deactivate the link.

Any suitable protocol may be used as the main messaging protocol between CEMs 12,14 and RMs 16. Preferably, the data link layer of the protocol defines a set of state codes that are associated with a particular state of a transceiver. The protocol handle performs the "data link control layer" function that defines how messages are transferred over communications links. Preferably, the data link layer protocol transfers and receives messages, partitioned into bytes, between two modules. A full-duplex protocol, and is byte-oriented with a single message frame acknowledge protocol is favoured.

As noted, secondary S-Links are used by RMs 16 requiring a higher bandwidth than a single primary S-Link provides. Since secondary S-Links only carry a subset of channels carried by the primary S-Link, secondary S-Link payload bandwidth for each secondary link is slightly greater than primary S-Link payload bandwidth.

Figure 4:
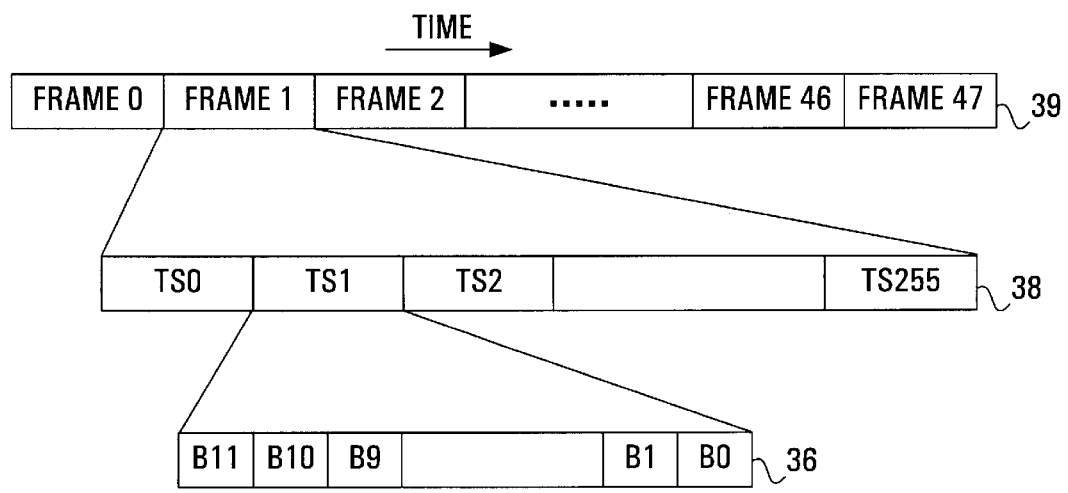
FIG. 4 is a block diagram of data organization within a serial stream transferred in accordance with an aspect of this invention.
Figure 6:
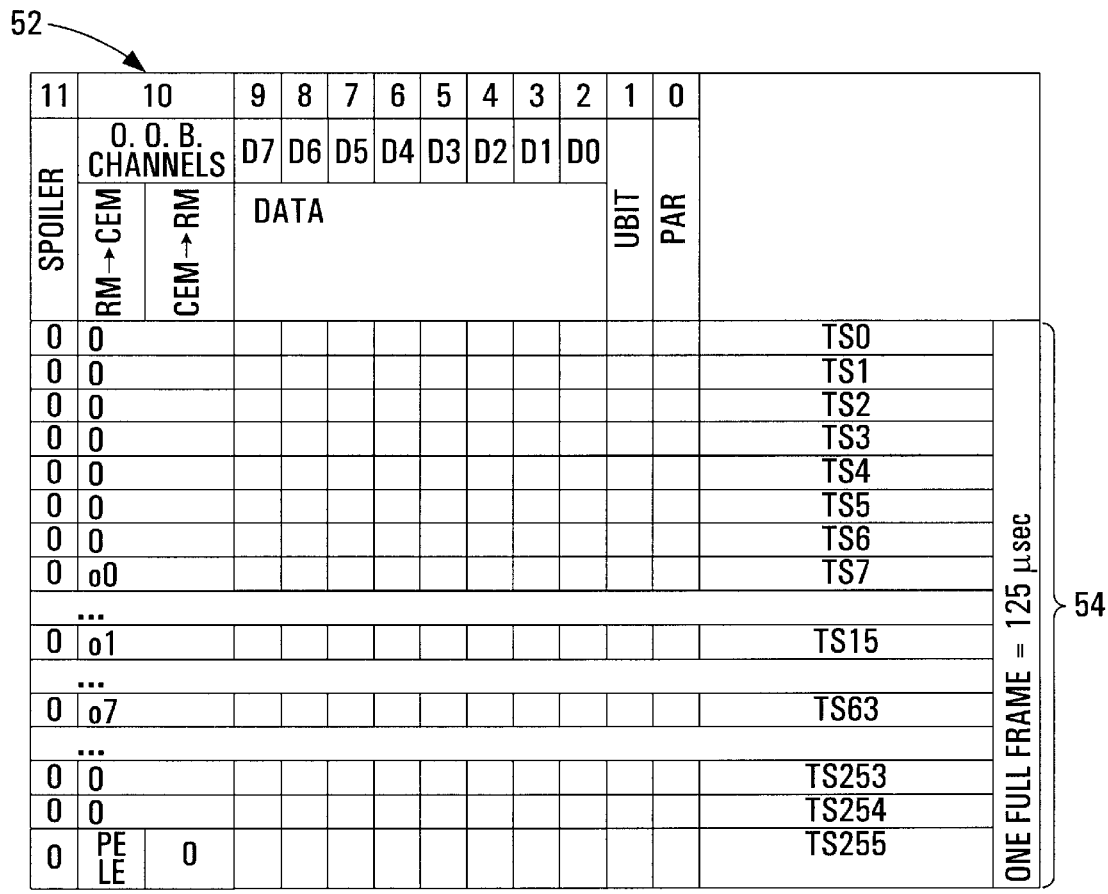
FIG. 6 is a further block diagram of data organization within a serial stream transferred in accordance with an aspect of this invention.

In operation, serial data transferred by an S-Link 18 is organized as shown in FIGS. 4, 5, and 6. As shown in FIG. 4, bits 36 of serial data are assembled into timeslots 38; timeslots 38 are assembled into frames 39; and numerous frames 39 are transmitted each second.

For reasons discussed below, each timeslot 38 comprises twelve bits 36 of data; each frame 39 two-hundred and fifty-six timeslots 38; and eight thousand frames 39 are transferred per second.

As shown in FIG. 5, a primary S-Link is used to transfer a framing channel comprised of all twelve bits of a single timeslot 40 (TS0) of each frame; an operations channel comprised of ten bits of timeslot 42 (TS248) of each frame; an out of band communications channel comprised of one bit 44 of each timeslot in each frame (the eleventh bit (ie bit 10) of each timeslot); and an internal messaging channel comprised of ten bits in numerous timeslots 46 (TS8, TS16 ... TS240) in each frame; and payload channels comprised of ten bits in the remaining timeslots 48 in each frame. As shown in FIG. 6, a secondary S-Link comprises only an out-of-band communications channel comprised of one bit 52 per timeslot; and payload channels comprised of ten bits of each timeslot 54.

The S-Link 18 framing channel is provided for link synchronization purposes. This framing channel is comprised of one timeslot 40 (TS0) for each frame of the primary S-Link, which has all bits set to '1's. It indicates the beginning of a frame and allows a receiver to synchronize the information stream from a transmitter. After power-up, the framing devices (not shown) enter an out-of-frame state. Upon receipt of two framing timeslots, framing will be recovered. In the event framing is not detected within the equivalent time of eight frames, the framer (CEM 12, 14 or RM 16) raises an interrupt to the processor and enters a loss-of-frame state ("LOF"). Frame may only be re-established from a LOF condition after the incoming signal is in frame for the equivalent of eight frames (ie. 1 mS). While in operation, the receipt of four consecutive frames without proper framing patterns will result in the framing device entering an out-of-frame state.

In standard configuration, only 224 timeslots in each frame are used for payload data. If more, or fewer timeslots are required for internal messaging, the S-Link 18 may be configured so that additional payload timeslots are converted for internal messaging, as described below.

The S-Link 18 operations channel, comprised of ten bits of a single timeslot 42 within each frame (FIG. 5) is used for communicating alarms, RM state bits, and super extended frame pattern sequences, between RMs 16 and CEM 12, 14. Such information is of course generated and processed by processors on the CEMs 12,14 and processors 24 on RMs 16.

A super extended frame ("SEF") sequence comprises up to 48 regular (ie. 125 us) frames. Up to 5 bits within the operations channel establish a count of frames within such a SEF, and are used for synchronizing transfer of a SEF.

The out-of-band communications channel comprised of one bit 44 of each timeslot allows transfer of register access, fram CRC and other control bits, as outlined below.

The internal messaging channel is comprised of ten bits of numerous timeslots 46 within each frame and is used for communication between CEM 12, 14 and RMs 16 equipped with on-board microprocessors. As noted above, the data link layer protocol transfers and receives messages within the internal messaging channel, partitioned to bytes between two modules. The data link layer protocol, may for example, send in-band reset instructions to the RMs 16.

Payload channels are comprised of the remaining timeslots 48 and may for example carry PCM voice samples, system messaging and data channels to be determined on the RMs 16 including ISDN B and D channels; IDLC system CSC/TMC and EOC channels.

In organizing the arrangement of the above channels within a single serial stream to be transferred by a primary S-Link, the following were considered:

1. Payload data within each timeslot should have the same format as within any host communications system (ie. the DMS switch). This obviates the need for translation or conversion of the data as it is passed across logical S-Links 18. Thus as the host communications is typically a DMS switch, each timeslot should comprise at least ten bits of data (eight bits of payload, one utility and one (odd) parity bit as used in a DMS host system).
2. A predetermined number of frames must be transferred each second in order to ensure compatibility with the payload data to be transferred. As the primary application of the communications system is to switch and transfer PCM voice data in telecommunications applications, eight-thousand frames per second should be transferred.
3. A single serial link should transfer messaging, control, framing and payload data.
4. The clock rate of serial link should be synchronized with the clock of the RM 16, CEM 12,14 and any host communications system; and
5. Each frame should comprise a sufficient number of timeslots to meet desired bandwidth requirements for a primary S-link. Additionally, the number of timeslots should be convenient for further manipulation.

In order to transfer link control signals it is convenient to transfer excess link 'control' bits within each timeslot. This ensures that the link control bits can be processed within the timeslots, rather than on a per frame basis. Based on the above considerations, the number of such control bits may be calculated as follows:

$$((10+x) * \text{number of timeslots per link} * \text{number of frames/second} = \text{synchronized clock rate})$$

As the communications system primarily switches voice payload data in PCM format, 8000 frames containing multiple timeslots of PCM data must be transferred each second.

As already noted, data from a host DMS communication system requires that each 8 bit PCM sample is accompanied by two bits of overhead data: one utility bit and one (odd) parity bit.

For computational convenience, the number of timeslots in each frame should be a power of two. This allows for easy electronic (binary) manipulation of the timeslots within each frame.

Now, as the host communication is typically a DMS communications system, the S-Link 18 clock rate, and DMS clock rate should be integer multiples of each other to allow for easy synchronization of these clocks at the physical level. Such synchronization can be achieved by a phase locked loop.

The DMS interface clock rate is 49.152 MHz. Thus, depending on the desired bandwidth of the link, the S-Link 18 transfer rate may conveniently be chosen as a fraction or multiple of the DMS interface clock rate. In practice, a clock rate of one half of 49.152 MHz was chosen. That is the S-Link 18 clock rate was chosen as 24.576 MHz. Using this selection determines that the number of timeslots/frame cannot exceed 307 (assuming a minimum of 10 bits/timeslot, and 8000 frames/second). However, as the number of timeslots/frame should be computationally convenient, the number of frames transferred by each S-Link is chosen as a power of two, that is 256.

As the secondary link uses the same clock as the primary link, and the number of physical interfaces should be limited, the bandwidth of secondary links is similarly limited to 24.576 MHz, comprised of 12 bits per timeslot; 256 timeslots/frame; and 8000 frames/second as illustrated in FIG. 6.

These 256 timeslots in an S-Link 18 frame are divided into 8 groups of 32 timeslots per group. The selection of 32 timeslots per group simplifies the design of the bandwidth allocator (not shown) in CEMs 12, 14.

The choice of 256 timeslots/frame also leads to the availability of two extra control bits/timeslot which may be transferred between CEM 12,14 and RM 16. Thus in the above equation:

$$(10+x) \text{ bits/timeslot} * 256 \text{ timeslot/frame} * 8000 \text{ frames/second} = 2,457,600 \text{ bits/second}$$

Solving for x, leads to x=2 in the equation. Therefore, two extra overhead or control bits are transferred with each eight bits of payload data, for a total of twelve bits per timeslot.

As two extra control bits per timeslot are insufficient to effectively interchange link control signals between RMs 16 and CEMs 12,14, single bits in each timeslot are combined to form an out-of-band communications channel for passing link control information, as shown in FIG. 5. This communications channel allows one bits per timeslot, full duplex, to be dedicated to link control information between the CEMs 12,14 and RMs 16. As 256 timeslots are exchanged per frame, and 8000 frames are exchanged per second, up to 2,048,000×1 bits per second are reserved for the out-of-band control channel within the serial stream for each primary or secondary S-Link.

The twelfth bit (ie. bit 11) of every time slot is set to a zero value, except for the framing timeslot 40 (ie. TS0). This way, no data may accidentally be confused for a framing timeslot 40.

As shown in FIG. 5, the out-of-band communications channel has the following characteristics:

I. bits within even timeslots are reserved for register access bits (other than bit 0, which is reserved for framing); and II. bits within odd timeslots are reserved for miscellaneous link control signals; time-of-day clock signals, clock tick control signals, FELE bits (from RMs 16 to CEM 12, 14); CEM activity bits (from the CEM 12,14 to the RM 16); CRC bits (both from and to the CEM 12 or 14);

The CRC bits transmitted with each frame, corresponds to an 8 bit CRC value calculated for the entire last frame (ie. the previous 3072 bits=256×12 bits). The S-Link CRC is calculated using an eight bit polynomial for point-to-point synchronous transmission protocols:

$$CRC8 = X^8 + X^2 + X + 1$$

The CRC transferred from and to RMs 16 in any frame will represent the CRC calculated for the previous frame. The receiver will calculate the CRC for the previous frame and compare the transmitted and received CRC. If the two differ, then an error attributable to the primary or secondary S-Link is detected. The CRC does not correct the contents of received serial stream, it merely takes into account the error in determining the general reliability of the link.

The final bit within each frame of the out-of-band channel, transferred from the RM 16 to the CEM 12,14 is an indication of whether an excessive number of errors for data transferred from CEM 12,14 to the RM 16 have been detected. The processor within each RM 16 keeps track of the number of detected CRC error and the number of detected parity errors detected by incrementing an error count memory location for each error. If the number of these error exceeds an acceptable threshold a far end link error flag ("FELE") ie. (TS255) of each frame within out-of band communications channel is set to '1'. This FELE bit may be used by CEM 12,14 to switch between an active RM 16 and a redundant RM 16.

The last eight even bits within each frame of the out-of-band channel, transferred from a CEM 12,14 to RM 16 are an indicator of which of the two CEMs 12,14 is active. If a byte formed by these last eight bits has a value of AAh, the transmitting CEM 12, 14 is active, if the value is 00h, the transmitting CEM 12, 14 is inactive. This allows the RM 16 to detect if a switch of activity ("Swact") is about to occur. As the activity bits are transferred near the end of each frame, RM 16 to may take the SWact into account between frames.

The out-of-band communications channel further provides the capability of sending multiple interrupts from the RM 16 to CEM 12, 14. Upon receipt, a processor (not shown) within CEM 12, 14 will process the interrupt, in the order depending on the interrupt level. As shown in FIG. 5, up to eight levels of interrupts are supported by within the out-of-band communications channel. Multilevel interrupts are encoded into a three bit pattern sequence which is transferred repeatedly from the RM 16 to CEM 12, 14 in the out-of-band channel during odd timeslots. This repeated sequence enables multilevel interrupt to be transferred from RM 16 to CEM 12,14 with 3us interrupt report latency. RMs 16 raise interrupts, while CEM 12,14 masks and clears interrupts by accessing internal interrupt priority mask and interrupt flag registers. Other bits within the out-of-band channel are currently not used, but could be used for further control data, as required.

Register Access

In addition to pre-established link control data, the out-of-band communications channel allows the CEM processor to directly access registers and memory locations within RM 16. This is referred to as "Register Access" or "RA". An RA protocol is a serialized processor interface, i.e. serially encoded bus cycle strobe, read/write, address, data and acknowledge.

RA may be used for, out-of-band reset of RM processor; reading of RM 16 memory by CEM 12,14; initialization of loopbacks for basic testability of S-Links; provisioning of internal messaging bandwidth; and/or interrupt mask and clear functions. RA supports read and write cycles by the CEM 12,14, including data 'burst' transfers. The maximum burst size is 256 bytes.

So, for example, in standard configuration thirty timeslots TS8, TS16, TS24, TS32, TS40, . . . TS240 of each frame is reserved for high level messaging interchange between CEM 12,14 and an RM 16. Certain applications may require more or less than thirty timeslots/frame in order to transfer messaging data between CEM 12,14 and RM 16. The CEM 12,14 may therefore use RA to configure the RM 16 to expect such additional, or fewer dedicated messaging timeslots, as required by a specific RM 16.

As another example, the error count memory location within a RM 16 may be probed in order to estimate a bit-error-rate (BER) of the S-Link.

RA is accomplished by allocating a reserved address space for each RM slot. RA treats each RM 16 as memory mapped input/output. RA data and instructions are sent in the even bits of the out-of-band channel detailed, above, as shown in FIG. 5.

Figure 7:
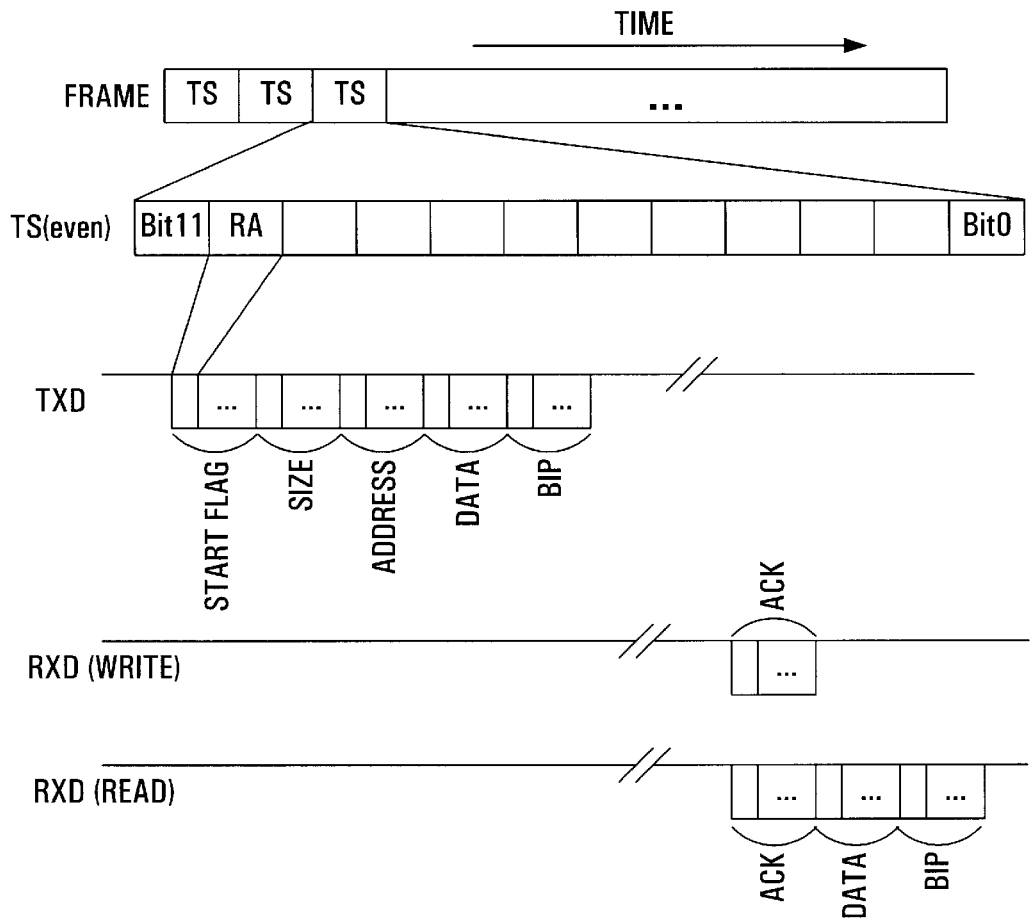
FIG. 7 is a block diagram of a protocol used in an embodiment of the present invention.

The RA protocol diagram is detailed in FIG. 7. RA is a handshake based protocol. The CEM 12,14 starts a transaction and RM 16 completes a transaction by termination with an acknowledge. The reserved codes for the handshake protocol are FFh for idle; 33h for start flag, write; 3Ch for start flag, read; 88h for PACK; and 77h for NACK.

Thus, an idle condition for RA is implemented as a sequence FFh of bytes. The RA master (CEM 12 or 14) can initiate cycles. It uses a 'Start Flag Read' (3Ch byte) or 'Start Flag Write' to initiate any link RA cycles.

As illustrated in FIG. 7 and 8, the following 8 bits represent the 'Size' identification field. The next 16 bits represent the 'stat address' during burst transfers or real address during a single byte transfer. The address field is followed by the Data field. Depending on the 'Size' field, data can be transferred as single byte or as a burst with up to 256 bytes in a single burst. The data field is followed by RA bit interleaved parity bit (BIP). It is calculated over size, address and data fields and provides some assurance of the integrity of the RA data.

During a write cycle after the entire bit sequence is transmitted, the CEM 12 or 14 enters 'Wait for End_Of_Cycle' state. The RM 16 sends an acknowledge, which can be of two types: PACK and NACK.

PACK indicates that register access has been completed successfully. NACK indicates that calculated BIP over received bit stream does not match the BIP calculated by the CEM 12 or 14 and received by RM 16. If either Size, Address or Data is incorrect Write operation on the RM 16 is blocked.

During a read cycle, CEM 12,14 sends only Start, Size, Address and BIP fields and then enters "Wait_For_Data" state. If the calculated BIP over received Size and Address fields matches a BIP calculated by the CEM 12,14, then an RM 16 starts a read cycle.

When the data is ready to be sent back to the CEM 12,14, the interface logic on the RM 16 will send back PACK, Data field and BIP calculated over Data only.

The PACK acknowledge indicates an orderly completion of a read cycle on RM 16. Upon reception of PACK, the Register Access logic on CEM 12,14 will inform the CEM processor (not shown) via interrupt or 'Ready' flag, thus indicating that the Register Access data buffer is full. If the RM 16 detect BIP error over Size and Address fields, it will send back a NACK.

Design for testability ("DFT") data is stored in the RM 16 local non-volatile memory and is used by the CEM 12,14 to drive ASIC and board structural tests.

Data transfer during Register Access is not S-Link frame aligned. Any access cycle can be started whenever Register Access logic is not busy.

It will be understood that the invention is not limited to the illustrations described herein which are merely illustrative of a preferred embodiment of carrying out the invention, and which are susceptible to modification of form, size, arrangement of parts and details of operation. The invention, rather, is intended to encompass all such modification within its spirit and scope, as defined by the claims.

We claim:

1. A transmitter for connection to a communications system, said transmitter comprising:
   a serial link interface operable to
   a) transfer a first chosen integer number of frames of data, per second, at a pre-set bit rate from said transmitter, each frame comprising
   a chosen second integer number of time slots of data, each time slot comprising in sequence, i) one of
   A) a predetermined number of consecutive first bits, said first bits comprising payload related data, framing or messaging bits; and
   B) a calculated number of consecutive second bits, said second bits comprising control or framing bits;

and ii) the other one of
- A) said predetermined number of first consecutive bits; and
- B) said calculated number of second consecutive bits;

wherein said calculated number is calculated so that the sum of said predetermined number and said calculated number multiplied by said chosen first integer and said chosen second integer equals the number of bits transferred in one second at said pre-set bit rate.

2. A transmitter for connection to a communications network, said transmitter comprising:

a serial link interface, operable to transfer a first chosen integer number of frames per second at a pre-set bit rate from said transmitter, each of said frames comprising:
- a) a chosen second integer number of groups of bits, each group of bits having an identical number of bits, and comprising:
  - i) a predetermined number of first bits, said first bits comprising payload related data in at least some of said groups;
  - ii) a calculated number of second bits, said second bits comprising a framing bit in each of said groups, and another bit carrying control information in at least some of said groups;

wherein said calculated number is calculated so that the sum of said predetermined number and said calculated number multiplied by said chosen first integer and said chosen second integer equals the number of bits transferred in one second at said pre-set bit rate.

3. The transmitter of claim 2, wherein said chosen second integer number is a power of two.

4. The transmitter of claim 3, wherein said chosen second integer number equals 256.

5. The transmitter of claim 4, wherein said chosen first integer number equals 8000.

6. The transmitter of claim 5, wherein said predetermined number of first bits equals 10.

7. The transmitter of claim 6, wherein said pre-set bit rate equals 24.576 Mbits/Sec.

8. The transmitter of claim 2, wherein said framing bit in each of said groups, has an identical value for all but one of said groups, thereby identifying one of said groups as a first group within each of said frames.

9. The transmitter of claim 2, in communication with a host communications system on said network, said host communications system having an internal clock having a clock frequency, and wherein said pre-set bit rate and said clock frequency are synchronized and are multiples of each other.

10. The transmitter of claim 2, wherein said bits carrying control information may be combined to form a messaging channel.

11. The transmitter of claim 2, wherein said payload related data bits comprise 8 payload data bits; 1 utility bit; and 1 parity bit.

12. The transmitter of claim 10, wherein said messaging channel includes at least one bit indicative of an error within said messaging channel.

13. The transmitter of claim 10, wherein said messaging channel transports interrupt requests from said transmitter.

14. A method of transferring bits in frames within a serial stream comprising:

transferring a first chosen integer number of frames per second at a pre-set bit rate, each of said frames comprising:
- a) a chosen second integer number of groups of bits, each group of bits having an identical number of bits, and comprising:
  - i) a predetermined number of first bits, said first bits comprising payload related data in at least some of said groups;
  - ii) a calculated number of second bits, said second bits comprising a framing bit in each of said groups, and another bit carrying control information in at least some of said groups;

wherein said calculated number is calculated so that the sum of said predetermined number and said calculated number multiplied by said chosen first integer and said chosen second integer equals the number of bits transferred in one second at said pre-set bit rate.

15. The method of claim 14, wherein said chosen second integer number is a power of two.

16. The method of claim 15, wherein said chosen second integer number equals 256.

17. The method of claim 16, wherein said chosen first integer number equals 8000.

18. The method of claim 17, wherein said predetermined number of first bits equals 10.

19. The method of claim 18, wherein said pre-set bit rate equals 24.576 Mbits/Sec.

20. The method of claim 14, wherein said framing bit in each of said groups, has an identical value for all but one of said groups, thereby identifying one of said groups as a first group within each of said frames.

21. The method of claim 14, wherein said pre-set bit rate is synchronized with a clock rate of a host communications system on said network, having an internal clock having a clock frequency, so that said pre-set bit rate and said clock frequency are multiples of each other.

22. The method of claim 14, wherein said bits carrying control information may be combined to form a messaging channel.

23. The method of claim 14, wherein said payload related data bits comprise 8 payload data bits; 1 utility bit; and 1 parity bit.

24. The method of claim 22, wherein said messaging channel includes at least one bit indicative of an error within said messaging channel.

25. The method of claim 22, wherein said messaging channel transports interrupt requests.

26. A data frame transmitted on a carrier medium, at a pre-set bit rate within a serial stream, wherein a first chosen integer number of data frames are transmitted per second, said frame comprising:

a chosen second integer number of groups of bits, each group of bits having an identical number of bits, and comprising:
- i) a predetermined number of first bits, said first bits comprising payload related data in at least some of said groups;
- ii) a calculated number of second bits, said second bits comprising a framing bit in each of said groups, and another bit carrying control information in at least some of said groups;

wherein said calculated number is calculated so that the sum of said predetermined number and said calculated number multiplied by said chosen first integer and said chosen second integer equals the number of bits transferred in one second at said pre-set bit rate.

* * * * *